March 23, 1965   C. M. HOBSON, JR   3,174,764
JACKETED GASKET
Original Filed July 20, 1959
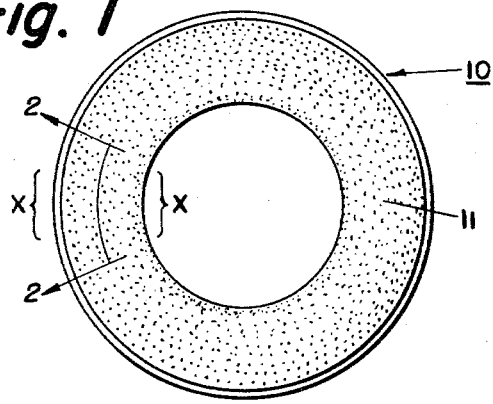
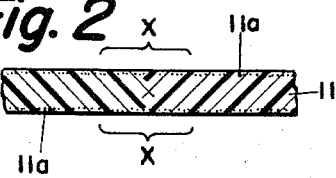
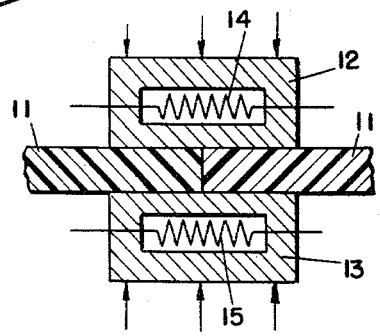
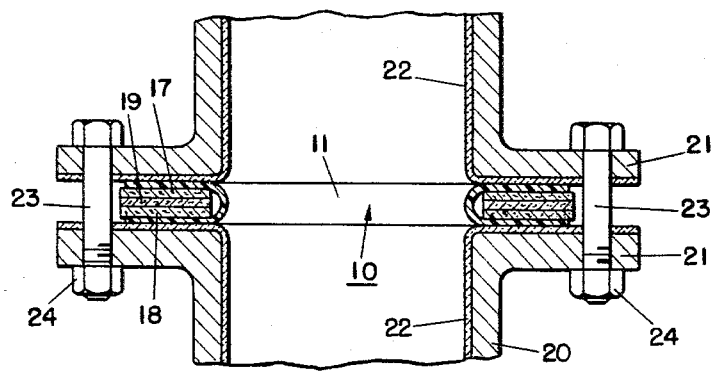

3,174,764
JACKETED GASKET
Charles M. Hobson, Jr., Camden, N.J., assignor to United States Gasket Company, Camden, N.J., a corporation of New Jersey
Original application July 20, 1959, Ser. No. 828,366. Divided and this application Oct. 3, 1961, Ser. No. 142,736
2 Claims. (Cl. 277—231)

This invention relates to gaskets of the type having jackets of fluorocarbon resin and has for an object the provision of gaskets and the method of manufacturing the same in which the outer fluorocarbon resin surface has been modified and rendered non-slippery. Though applicable to gaskets having outer surfaces of polytetrafluoroethylene available on the market under the trademark "Teflon," the invention can also be used in regard to gaskets having an outer surface of polychlorotrifluoroethylene available on the market under the trademark "Kel-F."

Teflon and Kel-F resins have characteristics which make the materials quite valuable for gaskets and particularly suitable for jacketed gaskets. Such resins are stable at high temperatures and chemically resistant to acids and other corrosive substances except fluorine at elevated temperature and molten sodium. By reason of these characteristics, gaskets having an outer layer or covering of Teflon or Kel-F have become extremely important for use in chemical piping and associated equipment. Many of these gaskets are used in applications involving the joining of glass-lined steel equipment, piping and the like which in itself provides a very slippery surface. Teflon and Kel-F, being such slippery materials when utilized in contact with the slippery glass surfaces, require excessive bolt-loading pressure on the joints which frequently damages the glazed lining, resulting in expensive repairs. This condition is due specifically to engaging high anti-friction surfaces and another cause of faliure because of this condition is the shifting of the gasket during installation. Further, under high vacuum service, this condition has caused the jacket to be pulled completely into the vessel or pipeline.

All of these conditions are of a critical nature and it has been found that they can be minimized or eliminated in accordance with the present invention.

The present invention is particularly applicable to a pipe joint or the like having flanges which have a slippery or low friction surface. A fluorocarbon resin gasket is disposed between the flanges with the faces thereof in engagement with the slippery surfaces. The gasket is characterized by the faces being of a fluorocarbon resin which has been rendered non-slippery to increase the frictional resistance of the gasket with respect to the pressure within the pipe. Further in accordance with the invention there is provided a jacketed gasket construction including a pair of opposed outer surfaces of polytetrafluoroethylene or the like, such surfaces being modified to increase their coefficient of friction and render them non-slippery.

Further in accordance with the invention, there is provided a method of making a fluorocarbon resin jacketed gasket with non-slippery surfaces including the steps of forming a strip of fluorocarbon resin tape into a closed ring with the ends of the tape in abutting relation, welding the abutting ends of the tape together to form an endless ring, treating at least the inner surface of the ring of tape with a solution of anhydrous ammonia and metallic sodium to modify the surface and render it non-slippery, and forming the endless ring of a tape around an inner gasket of resilient material with the modified non-slippery surface being exposed to provide the opposed surfaces of the jacketed gasket.

This application is a division of parent application Serial No. 828,366 filed July 20, 1959, which is directed to the provision of a jacketed gasket in which the jacket is made from Teflon or Kel-F tape which has been butt-welded to form an endless ring and thereby eliminate the condition of double thickness and non-uniform thickness of the gasket jacket normally found in conventional lap-welded joints.

For further objects and advantages of the invention and for a more detailed disclosure thereof, reference is to be had to the following description taken in conjunction with the accompanying drawing in which:

FIG. 1 is a top plan view of a jacketed gasket embodying the present invention;

FIG. 2 is a sectional view taken across the butt-welded portion of the jacket as indicated by lines 2—2 in FIG. 1;

FIG. 3 diagrammatically illustrates the manner of butt-welding the ends of the tape to form the jacket into an endless ring; and FIG. 4 is a sectional view of a joint between two flanged sections of glass-lined pipe with the gasket of FIG. 1 inserted therebetween.

Referring to FIGS. 1 and 4, the gasket 10 includes an outer layer or jacket 11 of fluorocarbon resin in the form of polytetrafluoroethylene tape or equivalent. The tape is relatively thin, for example in the order of .015″ thick. The length and width of the tape required to form the jacket 11 will depend upon the size of the joint which is to receive the gasket. The gaskets, when completed, are in ring form and it is not unusual for them to have an O.D. as great as 60 inches.

To form the tape into a jacket for the gasket, the tape is first cut to proper length and folded lengthwise along the center thereof into a U-shape as shown by the cross section of the jacket 11 in FIG. 4. The longitudinal edges of the tape are then pressed away from the center fold, as by tapered rollers to stretch the tape along the edges and thus cause the folded tape to form into a ring with the ends thereof in abutting relation. The tape is then unfolded at the ends and the ends placed in abutting relation for welding.

As indicated in FIG. 3, the ends of the tape 11 are butt-welded by the concurrent application of heat and pressure. This has been schematically illustrated in FIG. 3 by the upper and lower pressure blocks 12 and 13 which are heated by suitable means, such, for example as the heat resistor elements 14 and 15, the latter being energized from a suitable source, not shown. It will be noted that the pressure blocks 12 and 13 have a width sufficient to extend a substantial distance on either side of the abutting ends of the tape 11. With this arrangement, the ends of the tape will be tightly welded together as indicated at area $x$ in FIG. 2 with only a small reduction in thickness of the tape at that area. This is particularly desirable since it provides an endless ring or jacket 11 for the gasket which is substantially uniform in thickness throughout the entire circumference of the ring. This eliminates the condition of double thickness and non-uniform thickness of the gasket jacket which is normally found in lap-welded joints and which presents a source of leakage when the gasket is assembled in a joint, such as illustrated in FIG. 4.

In welding the ends of the tape together to form the butt-weld, the temperature utilized with Teflon is in the order of 700° F. (with Kel-F 500° F.), the pressure is in the order of about 20 to 40 pounds per square inch throughout the area of the blocks 12 and 13 and the pressure and temperature are maintained over a period of about one to two minutes, after which the welded area of the jacket is quenched in water.

After the jacket 11 has been butt-welded into an endless ring, the inner surface thereof (i.e. the surface which, when the jacket is folded, will provide the outer opposed surfaces of the gasket), is then treated to render it non-slippery. This preferably is accomplished by contacting the surface with an ammonia solution of sodium. Such solution may be obtained by dissolving in anhydrous ammonia about 1½% by weight of metallic sodium. It is to be understood that both the inner and outer surfaces of the jacket may be rendered non-slippery in the foregoing manner if desired. After the jacket 11 has been treated with the foregoing solution to provide the modified surfaces 11a, it is dipped in a washing tank to remove the excess solution and then dried.

After the foregoing operations, the jacket 11 is then ready to be assembled about an inner gasket to form a completed gasket 10 as shown in FIGS. 1 and 4. The inner gasket may comprise a single ring of suitable resilient or compressible material or it may comprise a plurality of rings. For example, as shown in FIG. 4, the inner gasket comprises a plurality of rings 17, 18 and 19, the center ring 19 being illustrated as a relatively soft asbestos material while the outer rings 17 and 18 have been illustrated as a relatively hard compressed asbestos. It is to be understood that other inner gasket rings may be utilized such, for example, as those of the type disclosed in my Patent 2,580,546.

The pipe joint illustrated in FIG. 4 is of the type in which the pipe 20 and flanges 21 are provided with a glass lining 22. The flanges 21 are provided with a series of holes extending around the periphery thereof through which a series of bolts 23 extend. The bolts 23 are provided with nuts 24 which are adapted to be tightened until the loading on the gasket 10 is sufficient to retain it within its central location between the flanges 21, 21 and in axial alignment with the mating pipe sections 20, 20. By reason of the non-slippery surfaces on the jacket 11, the bolt-loading pressure may be substantially reduced from pressures heretofore required to retain the Teflon or Kel-F gaskets in glass-lined pipe joints and other similar joints which present slippery surfaces to the jacketed gaskets. It is believed that this substantial reduction in bolt-loading pressure is due to the fact that the static coefficient of friction for the Teflon or Kel-F surface, when treated in the foregoing manner, has been increased by at least in the order of two. By enabling the bolt-loading pressure to be decreased, the present invention has eliminated the danger of damaging the glass lining on the pipe and flanges due to overloading and has enabled the gaskets to be maintained in their central position without shifting during installation or during service under the application of high vacuum or other pressure conditions.

It is to be understood that the present invention of treating Teflon and Kel-F gaskets to render their outer surfaces non-slippery is also applicable to fluorocarbon gaskets of other types including the types disclosed in my aforesaid patent. It is further understood that the term fluorocarbon resin employed in the appended claims is used generically and is intended to include Teflon and Kel-F and their equivalents and that the term pressure is intended to include vacuum.

What is claimed is:
1. A gasket construction comprising an inner resilient compressible sealing gasket and an outer jacket of fluorocarbon resin enclosing said inner gasket, said jacket comprising strip material of fluorocarbon resin with the ends thereof welded together in abutting relation to provide continuous smooth unbroken exposed annular faces of substantially uniform thickness throughout their circumferences, said faces having been rendered non-slippery to increase their coefficient of friction to a magnitude substantially above that of the normal coefficient of friction of said fluorocarbon resin.

2. In a pipe joint between a pair of flanges at least one of which has a slippery surface, a gasket disposed between said flanges and having at least one face in engagement with said slippery surface, said gasket comprising an inner resilient compressible sealing gasket and an outer jacket of fluorocarbon resin enclosing said inner gasket, said gasket being characterized by said jacket comprising strip material of fluorocarbon resin with the ends thereof welded together in abutting relation to provide continuous smooth unbroken annular faces of substantially uniform thickness throughout their circumferences, said annular faces having been chemically modified and rendered non-slippery to increase their coefficient of friction to a magnitude substantially above that of the normal coefficient of friction of said fluorocarbon resin thereby to increase the frictional resistance of said gasket with respect to the pressure within said pipe.

References Cited by the Examiner
UNITED STATES PATENTS

| 981,524 | 1/11 | Bonner | 277—207 |
|---|---|---|---|
| 2,459,720 | 7/49 | Poltorak | 277—227 |
| 2,580,546 | 1/52 | Hobson | 277—231 XR |
| 2,606,574 | 8/52 | Lefebvre | 285—55 |
| 2,705,693 | 4/55 | Dildilian et al. | 156—304 |
| 2,789,063 | 4/57 | Purvis. | |
| 2,805,872 | 9/57 | Routh | 285—55 |
| 2,898,229 | 8/59 | Herr et al. | |
| 2,906,552 | 9/59 | White | 277—228 |
| 2,963,394 | 12/60 | Wilkinson | 156—304 |
| 2,964,065 | 12/60 | Haroldson et al. | 138—76 |
| 3,018,120 | 1/62 | Vann | 285—55 |
| 3,020,185 | 2/62 | Moffitt et al. | 277—229 XR |
| 3,051,500 | 8/62 | Wiltse | 277—228 |

EDWARD V. BENHAM, *Primary Examiner.*
SAMUEL ROTHBERG, *Examiner.*